(12) United States Patent
Tsujino et al.

(10) Patent No.: US 11,244,801 B2
(45) Date of Patent: Feb. 8, 2022

(54) X-RAY GENERATION DEVICE AND X-RAY IMAGE CAPTURE SYSTEM

(71) Applicant: CANON ANELVA CORPORATION, Kanagawa (JP)

(72) Inventors: Kazuya Tsujino, Kanagawa (JP); Yoichi Ando, Kanagawa (JP)

(73) Assignee: CANON ANELVA CORPORATION, Kanagawa (JP)

( * ) Notice: Subject to any disclaimer, the term of this patent is extended or adjusted under 35 U.S.C. 154(b) by 0 days.

(21) Appl. No.: 17/211,079

(22) Filed: Mar. 24, 2021

(65) Prior Publication Data

US 2021/0233734 A1 Jul. 29, 2021

Related U.S. Application Data

(63) Continuation of application No. PCT/JP2018/039203, filed on Oct. 22, 2018.

(51) Int. Cl.
*H01J 35/00* (2006.01)
*H01J 35/14* (2006.01)
(Continued)

(52) U.S. Cl.
CPC ............ *H01J 35/147* (2019.05); *G01N 23/04* (2013.01); *H01J 35/116* (2019.05); *H01J 35/153* (2019.05); *G01N 2223/204* (2013.01)

(58) Field of Classification Search
CPC ........ H01J 35/116; H01J 35/14; H01J 35/147; H01J 35/153; H01J 35/30
See application file for complete search history.

(56) References Cited

U.S. PATENT DOCUMENTS

| 4,007,375 A | 2/1977 | Albert |
| 5,629,969 A | 5/1997 | Koshishiba |

(Continued)

FOREIGN PATENT DOCUMENTS

| JP | 7-260713 A | 10/1995 |
| JP | 2001-126650 A | 5/2001 |

(Continued)

OTHER PUBLICATIONS

Office Action dated Sep. 10, 2020, in counterpart Taiwan Application No. 108137584 (15 pages).

(Continued)

*Primary Examiner* — Dani Fox
(74) *Attorney, Agent, or Firm* — Venable LLP

(57) ABSTRACT

An X-ray generation device includes a cathode including an electron source generating an electron beam, an anode including a target to transmit an X-ray generated by collision of the electron beam, and a convergence electrode converging the electron beam toward the target. The target has a first region having a locally small thickness and a second region having a larger thickness than the first region. The X-ray generation device further includes a deflection unit to switch an incident position of the electron beam between the first region and the second region. The deflection unit has an adjustment mode to adjust an X-ray focal spot diameter and an X-ray generation mode to generate an X-ray, the electron beam is caused to enter the first region in the adjustment mode, and the electron beam is caused to enter the second region in the X-ray generation mode.

20 Claims, 9 Drawing Sheets

(51) Int. Cl.
  *H01J 35/08* (2006.01)
  *G01N 23/04* (2018.01)

(56) References Cited

U.S. PATENT DOCUMENTS

| | | | |
|---|---|---|---|
| 10,453,579 | B2 | 10/2019 | Miyaoka |
| 10,971,323 | B1* | 4/2021 | Hansson ................ H01J 35/08 |
| 2011/0150184 | A1 | 6/2011 | Kozaczek et al. |
| 2018/0005721 | A1 | 1/2018 | Miyaoka |
| 2019/0004193 | A1 | 1/2019 | Cao et al. |
| 2019/0311874 | A1* | 10/2019 | Tuohimaa ................ H05G 1/52 |

FOREIGN PATENT DOCUMENTS

| | | |
|---|---|---|
| JP | 2005-332623 A | 12/2005 |
| JP | 2008-140654 A | 6/2008 |
| TW | 201713940 A | 4/2017 |
| WO | 2016/125289 A1 | 8/2016 |

OTHER PUBLICATIONS

Office Action dated Sep. 7, 2021, in counterpart Chinese Application No. 201880098949.6 (20 pages).

* cited by examiner

FOCUS VOLTAGE: A

FOCUS VOLTAGE: B

FOCUS VOLTAGE: C

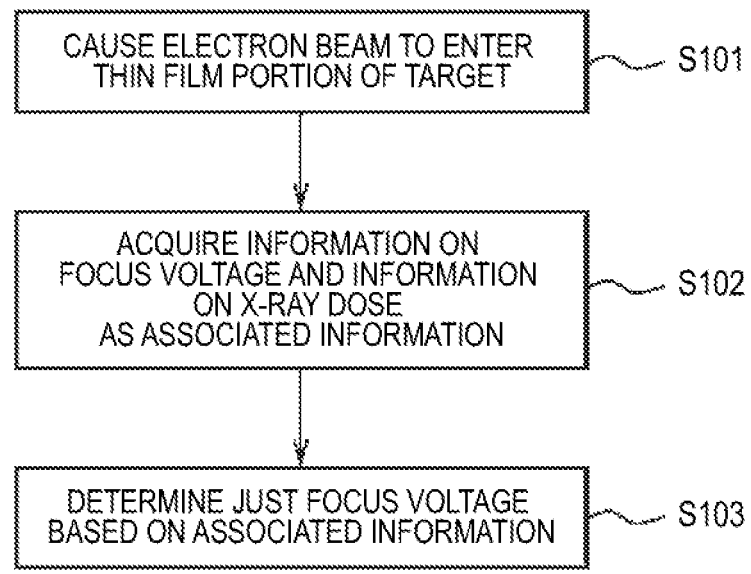
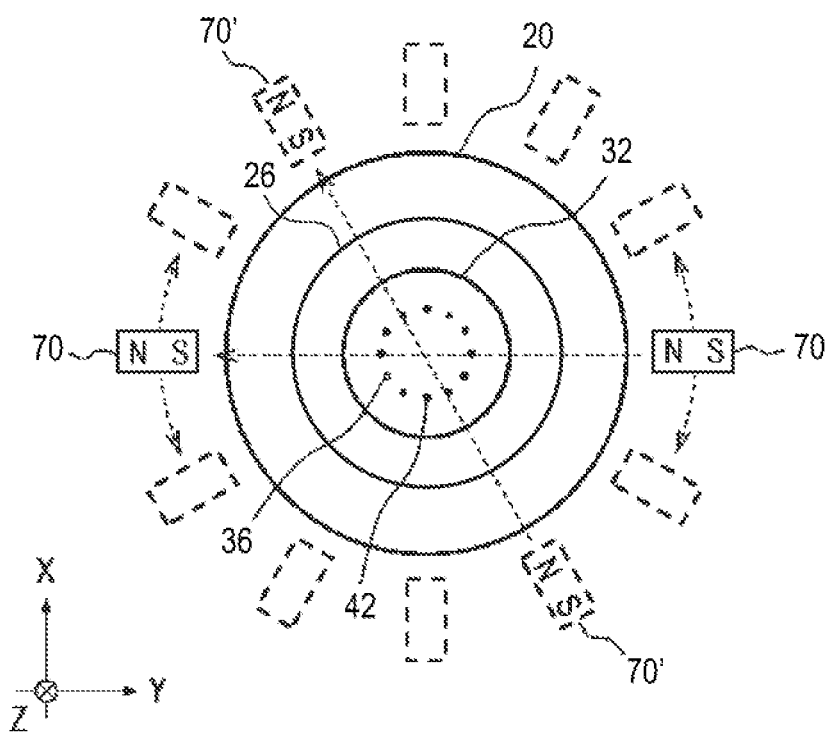

X-RAY GENERATION DEVICE AND X-RAY IMAGE CAPTURE SYSTEM

CROSS-REFERENCE TO RELATED APPLICATIONS

This application is a Continuation of International Patent Application No. PCT/JP2018/039203, filed Oct. 22, 2018, which is hereby incorporated by reference herein in its entirety.

BACKGROUND OF THE INVENTION

Field of the Invention

The present invention relates to an X-ray generation device and an X ray image capture system.

Description of the Related Art

As one of industry nondestructive inspection apparatus, an X-ray image capture system is known. For example, an X-ray inspection apparatus having a micro focus X-ray tube is used for inspection of electronic devices represented by a semiconductor integrated circuit substrate. An X-ray tube is an X-ray source emitting an X-ray from a target by applying a high voltage with a predetermined potential difference in accordance with X-ray energy between an anode and a cathode and emitting electrons accelerated by this high voltage to the target.

The resolution in an X-ray image capture system is improved when the X-ray focal spot diameter is smaller. Thus, conventionally, various technologies for achieving a fine X-ray focal spot diameter have been proposed. International Publication No. WO2016/125289 proposes a technology that, by providing a fine recess (X-ray low absorbance part) in a target having a large thickness so that an X-ray is unable to transmit to the opposite side to the irradiation side of an electron beam (which will be absorbed inside the target) even if the electron beam is emitted to a target and the X-ray is generated, achieves an X-ray focal spot diameter based on the diameter size of the X-ray low absorbance part regardless of the size of the incident region of the electron beam to the target (electron beam spot). Further, Japanese Patent Application Laid-Open No. 2005-332623 proposes a technology that, by providing a shield layer that shields a target from an electron beam on the electron beam irradiation side of the target and providing a fine opening in the shield layer, achieves an X-ray focal spot diameter based on the diameter size of the opening regardless of the size of the spot diameter of the electron beam.

As discussed above, in the technologies disclosed in International Publication No. WO2016/125289 and Japanese Patent Application Laid-Open No. 2005-332623, the X-ray focal spot diameter of an X-ray generation device is defined by a diameter size of a recess or an opening formed in advance in a target or a target stack structure. It is therefore necessary to apply fine processing of a desired X-ray focal spot diameter size to the target or the target stack structure.

As a method for achieving a fine X-ray focal spot diameter without depending on the size of such a recess or an opening, there is a method for reducing an incident region (spot) of an electronic beam to a target plane. The spot diameter of an electronic beam depends on X-ray emission conditions (a tube voltage and a tube current) and an applied voltage (focus voltage) to a convergence electrode that converges electrons moving from a cathode including an electron source to an anode including a target. Since the X-ray emission condition is determined in accordance with an object, the spot diameter of an electron beam is reduced by adjusting the focus voltage for a desired X-ray emission condition. Adjustment of the focus voltage is performed by applying various voltages to the convergence electrode under a desired X-ray emission condition to acquire X-ray transmission images, performing image processing on respective X-ray transmission images to finely compare the resolution, and determining a focus voltage providing the highest resolution (just focus voltage). However, such a method of adjusting the focus voltage requires significant efforts.

SUMMARY OF THE INVENTION

The present invention intends to provide an X-ray generation device and an X-ray image capture system that may easily reduce the X-ray focal spot diameter.

According to one aspect of the present invention, provided is an X-ray generation device including a cathode including an electron source that generates an electron beam, an anode including a transmission type target configured to transmit, in an incident direction of the electron beam, an X-ray generated by collision of the electron beam, and a convergence electrode that converges the electron beam toward the transmission type target, wherein the transmission type target has a first region having a locally small thickness and a second region having a larger thickness than the first region, wherein the X-ray generation device further comprises an electron beam deflection unit configured to switch an incident position of the electron beam to the transmission type target between the first region and the second region, and wherein the electron beam deflection unit has an adjustment mode to adjust an X-ray focal spot diameter and an X-ray generation mode to generate an X-ray, the electron beam is caused to enter the first region in the adjustment mode, and the electron beam is caused to enter the second region in the X-ray generation mode.

Further, according to another aspect of the present invention, provided is a method of adjusting an X-ray focal spot diameter in an X-ray generation device including a cathode including an electron source that generates an electron beam, an anode including a transmission type target configured to transmit, in an incident direction of the electron beam, an X-ray generated by collision of the electron beam, and a convergence electrode that converges the electron beam toward the transmission type target, the method including changing an applied voltage to the convergence electrode in a state where the electron beam enters a first region having a locally small thickness formed in the transmission type target, and acquiring a relationship between the applied voltage to the convergence electrode and an X-ray dose emitted from the transmission type target and determining a just focus voltage based on the relationship.

Further features of the present invention will become apparent from the following description of exemplary embodiments with reference to the attached drawings.

BRIEF DESCRIPTION OF THE DRAWINGS

FIG. 6 is a flowchart illustrating an adjustment method of an X-ray focal spot diameter in the X-ray generation device according to the first embodiment of the present invention.

FIG. 7 is a plan view illustrating a configuration example of the X-ray generation device according to a second embodiment of the present invention.

DESCRIPTION OF THE EMBODIMENTS

First Embodiment

Figure 1:
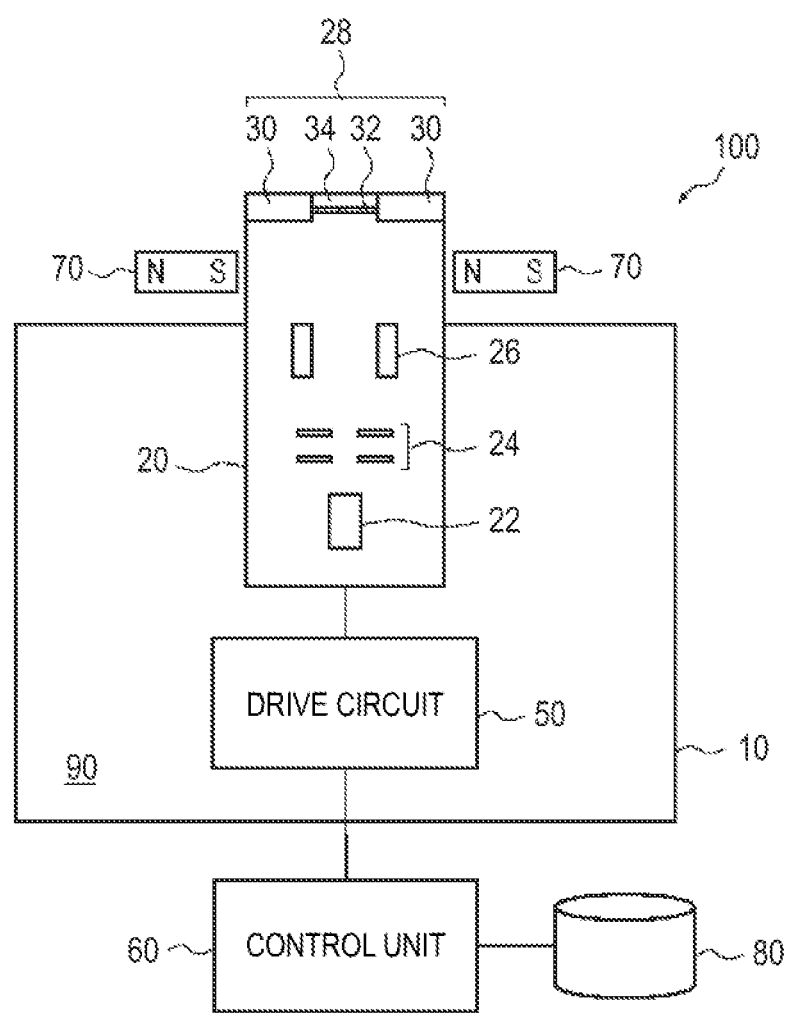
FIG. 1 is a schematic sectional view illustrating a configuration example of an X-ray generation device according to a first embodiment of the present invention.

A general configuration of an X-ray generation device according to a first embodiment of the present invention will be described with reference to FIG. 1. FIG. 1 is a schematic sectional view illustrating a configuration example of an X-ray generation device according to the present embodiment.

As illustrated in FIG. 1, an X-ray generation device 100 according to the present embodiment includes an X-ray tube 20, a drive circuit 50, a control unit 60, an electron beam deflection unit 70, and a storage device 80. It is preferable that, among these components, at least the X-ray tube 20 and the drive circuit 50 be arranged in a housing container 10. In the housing container 10, an insulating oil 90 may be filled in order to ensure a dielectric voltage between components arranged therein. The insulating oil 90 is preferably an electric insulating oil such as a mineral oil, a silicone oil, a fluorine based oil, or the like. A resin may be used instead of an insulating oil. A mineral oil that is easy to handle is preferably applied to an X-ray generation device using the X-ray tube 20 whose rated tube voltage is around 100 kV.

The X-ray tube 20 includes an electron source 22, a grid electrode 24, a convergence electrode 26, and an anode 28. The cathode includes the electron source 22. The anode 28 includes an anode member 30, a target 32, and a target support 34. The electron source 22, the grid electrode 24, and the convergence electrode 26 are connected to the drive circuit 50 and desired control voltages are applied thereto from the drive circuit 50, respectively. The anode 28 is connected to the housing container 10 maintained at a ground potential.

The electron source 22 is not particularly limited, and a hot cathode such as a tungsten filament or an impregnated type cathode or a cold cathode such as a carbon nanotube can be applied, for example. The material forming the target 32 is preferably a material having a high melting point and a high X-ray generation efficiency, and tungsten, tantalum, molybdenum, an alloy thereof, or the like can be applied, for example. The target 32 used in the present invention is a transmission type target having a thickness that enables a generated X-ray to transmit to the opposite side to the irradiation side of electrons. The target support 34 supports the target 32 and forms an X-ray transmission window used for emitting an X-ray from the target 32 to the outside. The material forming the target support 34 is preferably a material having a high X-ray transmissivity and a high thermal conductivity, and diamond can be applied, for example. A use of a material having a high thermal conductivity has an advantageous effect of suppressing a rise in temperature of the target 32 due to electron beam irradiation and reducing deterioration of the target 32.

Electrons emitted from the electron source 22 are accelerated by a high voltage with respect to the anode 28 to generate an electron beam, this electron beam is collided to the target 32 provided in the anode 28, and thereby an X-ray is generated at the target 32. The X-ray dose emitted from the target 32 can be controlled by the electron beam amount emitted to the target 32. The electron beam amount emitted to the target 32 can be controlled by a grid voltage applied to the grid electrode 24. Further, the spot diameter of the electron beam can be controlled by a focus voltage applied to the convergence electrode 26.

The electron beam deflection unit 70 is provided outside the tube (outside) of the X-ray tube 20 and between the cathode and the anode 28. For example, the electron beam deflection unit 70 is provided between the convergence electrode 26 and the target 32. Further, the electron beam deflection unit 70 has a function of causing a magnetic field to work on an electron beam generated inside the X-ray tube 20 and deflecting the trajectory of an electron beam entering the target 32 and is configured to be able to switch incident positions of the electron beam. The electron beam deflection unit 70 may be one or more permanent magnets or may be one or more electromagnets. For example, as illustrated in FIG. 1, the electron beam deflection unit 70 may include two permanent magnets, and the two permanent magnets are arranged around the X-ray tube 20 such that the S-pole of one permanent magnet faces the N-pole of the other permanent magnet in the tube diameter direction. Alternatively, the electron beam deflection unit 70 may be a single permanent magnet arranged around the X-ray tube 20 such that the magnetic pole is oriented to the tube diameter direction.

Note that the electron beam deflection unit 70 may have any configuration as long as the position at which the electron beam enters the target 32 can be switched between two points. For example, the electron beam deflection unit 70 may be configured to be removable or may be configured to be rotatable. For example, when the electron beam deflection unit 70 is the permanent magnet, the electron beam deflection unit 70 may be configured to be removable with respect to the X-ray generation device 100 by being fixed by a screw or a spring. When being the electromagnet, the electron beam deflection unit 70 may be configured to be able to turn on and off a power source that flows current to the electromagnet. The electron beam deflection unit 70 may have a rotation mechanism, a motion mechanism, or the like having a motor or the like, and thereby the electron beam deflection unit 70 may be configured so as to be able to change the strength or the orientation of the magnetic field of the electron beam deflection unit 70 caused to work on the electron beam.

The drive circuit 50 includes a high voltage generator circuit, an electron source drive circuit, a grid voltage control circuit, a focus voltage control circuit, or the like (all of which are not illustrated). The high voltage generator circuit generates a high voltage to be applied between the anode 28 and the cathode (the electron source 22) of the X-ray tube 20. The electron source drive circuit controls the voltage or the current to be supplied to the electron source 22. The grid voltage control circuit controls the grid voltage to be supplied to the grid electrode 24. The focus voltage control circuit controls the focus voltage to be supplied to the convergence electrode 26. The control unit 60 is connected to the drive circuit 50. The control unit 60 supplies a control signal used for controlling the high voltage generator circuit, the electron source drive circuit, the grid voltage control circuit, the focus voltage control circuit, the electron beam deflection unit 70 (which may have a rotation mechanism or a motion mechanism), or the like to the drive circuit 50. The storage device 80 stores a voltage table in which various X-ray emission conditions and just focus voltages under these conditions are stored in association with each other.

Figure 2:
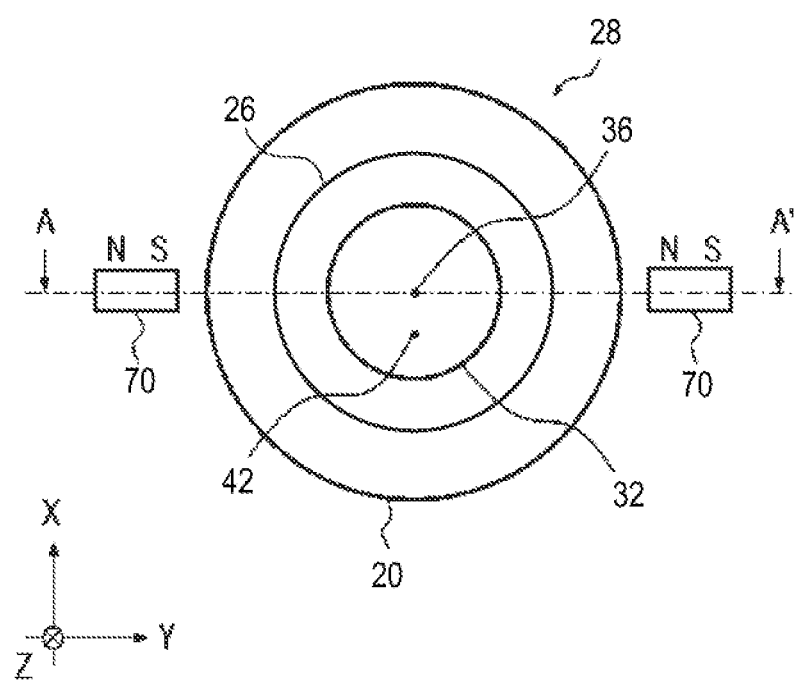
FIG. 2 is a plan view illustrating a configuration example of the X-ray generation device according to the first embodiment of the present invention.

Next, the characteristic structure in the X-ray generation device of the first embodiment will be described with reference to FIG. 2 to FIG. 3D. FIG. 2 is a plan view illustrating the structure of the X-ray generation device 100 of the first embodiment. FIG. 2 illustrates a plan view of the X-ray generation device 100 of the first embodiment in a plane (a plane parallel to X-Y plane) perpendicular to the traveling direction (Z-axis direction) of the electron beam. The sectional view of the portion of the X-ray tube 20 of FIG. 1 corresponds to a sectional view taken along a line A-A' of FIG. 2.

The target 32 provided in the X-ray generation device 100 in the first embodiment has a thin film portion 36 having a locally small thickness. Further, the thin film portion 36 is located on the extended line of the center axis (optical axis) of the convergence electrode 26.

Furthermore, the X-ray generation device 100 in the first embodiment includes the electron beam deflection unit 70 configured to be able to switch a state of not causing a magnetic field to work on the electron beam traveling to the target 32 and a state of causing a magnetic field to work thereon. Since the thin film portion 36 is located on the extended line of the center axis (optical axis) of the convergence electrode 26, when no magnetic field is caused by the electron beam deflection unit 70 to work on the electron beam converged by the convergence electrode 26, the electron beam converged by the convergence electrode 26 enters the thin film portion 36 of the target 32. On the other hand, when a magnetic field is caused by the electron beam deflection unit 70 to work on the electron beam converged by the convergence electrode 26, the electron beam is forced to be deflected by Lorentz force and enters an electron beam irradiation portion 42. In other words, the electron beam deflection unit 70 is a switching unit that switches the incident position of the electron beam to the target 32 between a first region (the thin film portion 36) that is a region in which the thickness is locally small in the target 32 and a second region (the electron beam irradiation portion 42) that is a region different from the first region in the target 32.

The electron beam deflection unit 70 may have any configuration as long as it can switch the incident position of the electron beam between two points (the thin film portion 36 and the electron beam irradiation portion 42) and is an electromagnet, for example. As another example, the electron beam deflection unit 70 may be a permanent magnet configured to be removable with respect to the X-ray generation device 100 by being latched by a screw or a spring. FIG. 1 illustrates the electron beam deflection unit 70 having two permanent magnets. The two permanent magnets are arranged around the X-ray tube 20 such that the S-pole of one permanent magnet faces the N-pole of the other permanent magnet in the tube diameter direction. Note that only one permanent magnet may be arranged around the X-ray tube 20. As another example, a shield plate that blocks a magnetic field and is configured to be arrangeable/removable may be provided between the electron beam deflection unit 70 and the X-ray tube 20.

Figure 3A:
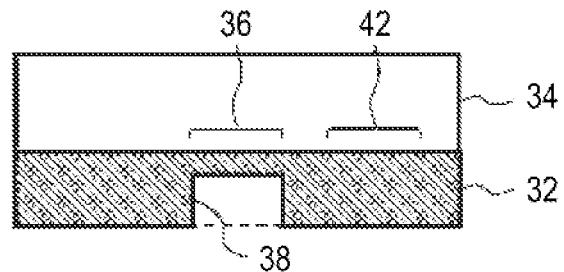
FIG. 3A, FIG. 3B, FIG. 3C and FIG. 3D are schematic sectional views illustrating configuration examples of a target in the X-ray generation device according to the first embodiment of the present invention.
Figure 3B:
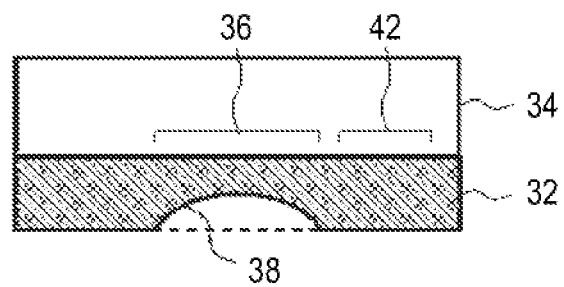
Figure 3C:
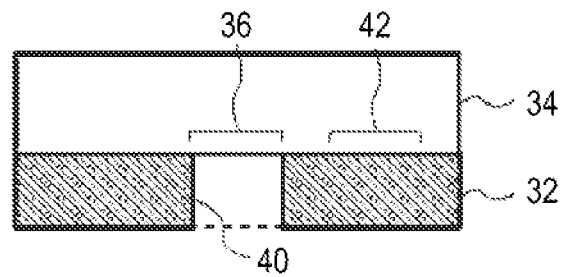
Figure 3D:
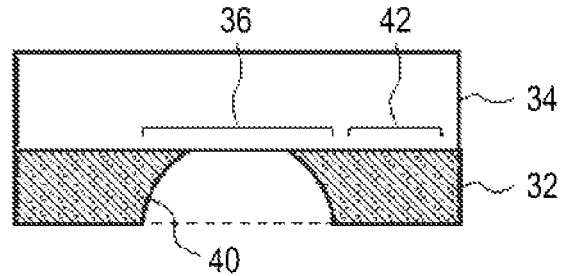

FIGS. 3A-3D are sectional views illustrating configuration examples of the target 32 having the electron beam irradiation portion 42 and the thin film portion 36. The electron beam irradiation portion 42 has a film thickness through which an X-ray can transmit in the incident direction of the electron bean, that is, a film thickness through which the X-ray can be taken out on the target support 34 side of the opposite side to the incident plane of the electron beam. For example, the film thickness of the electron beam irradiation portion 42 is not more than 10 micrometers, and more preferably, not more than 5 micrometers. On the other hand, the thin film portion 36 is not particularly limited as long as it is configured to have a thinner film thickness of the target 32 than the electron beam irradiation portion 42. For example, as illustrated in FIG. 3A and FIG. 3B, the thin film portion 36 may be formed of a recess 38 provided in the target 32. Although formed on the side opposed to the target support 34 in FIGS. 3A-3D, the recess 38 may be present on the target support 34 side or may be present on both sides. Further, as illustrated in FIG. 3C and FIG. 3D, the thin film portion 36 may be formed of a through hole 40 provided in the target 32. The through hole 40 corresponds to a case where the film thickness of the thin film portion 36 of the target 32 is zero.

It is desirable that the thickness of the target 32 in the thin film portion 36 of the present invention decrease continuously or stepwise toward the centroid (center axis) of the thin film portion 36. With the thin film portion 36 having such a thickness, the relationship between the focus voltage and the X-ray dose, which will be described below in detail, becomes clear, and this facilitates determination of the just focus voltage. Further, it is desirable that the shape of the thin film portion 36 be rotational symmetry about the center axis. For example, the thin film portion 36 may be formed of the rectangular recess 38 or the through hole 40 as illustrated in FIG. 3A and FIG. 3C. Alternatively, the thin film portion 36 may be formed of the substantially spherical recess 38 or through hole 40 as illustrated in FIG. 3B and FIG. 3D.

The thin film portion 36 of the target 32 may be a portion formed in advance in the target 32 by mechanical processing before assembly of the X-ray generation device or may be formed by intentionally excessively irradiating the target 32 with an electron beam after assembly of the X-ray generation device. Since the thin film portion 36 of the present invention is not to directly define an X-ray focal spot diameter as described below in detail, the diameter (area) of the thin film portion 36 may be larger than or smaller than the spot diameter (area) of a desired electron beam. Therefore, it is not necessary to perform precise fine processing for forming a recess or an opening, which directly defines an X-ray focal spot diameter in the conventional art, in the target 32 or a target stack structure.

Next, the concept of the adjustment method for an X-ray focal spot diameter of the present invention will be described with reference to FIG. 4A to FIG. 6.

The target 32 of the present invention has a film thickness through which an X-ray can transmit in the incident direction of an electron beam, that is, a film thickness through which an X-ray can be taken out on the target support 34 side of the opposite side to the incident plane of the electron beam. When such the target 32 is used, the focal spot diameter of the X-ray emitted from the X-ray tube 20 changes depending on the spot diameter of the electron beam entering the target 32. That is, the larger the spot diameter of an electron beam is, the larger the X-ray focal spot diameter is, and the smaller the spot diameter of an electron beam is, the smaller the X-ray focal spot diameter is. To reduce the X-ray focal spot diameter, it is necessary to reduce the spot diameter of the electron beam entering the target 32. Further, the spot diameter of the electron beam is the smallest in a state where the focal point of the electron beam is located on the target 32.

Figure 4A:
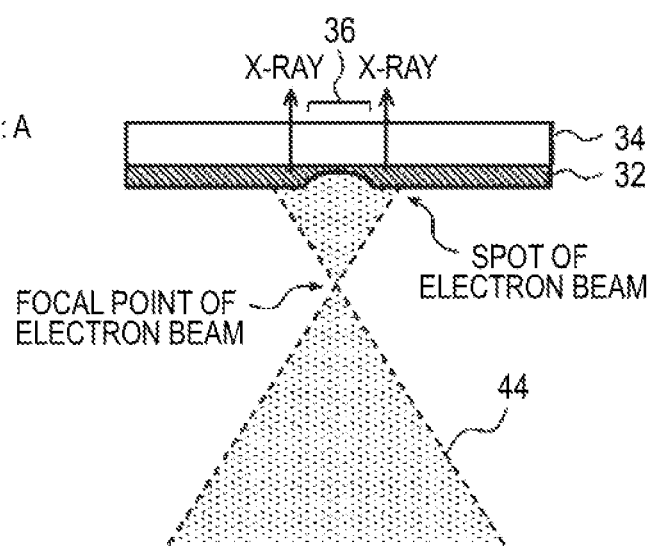
FIG. 4A, FIG. 4B and FIG. 4C are schematic diagrams illustrating relationships between a spot and a focal point position of an electron beam.
Figure 4B:
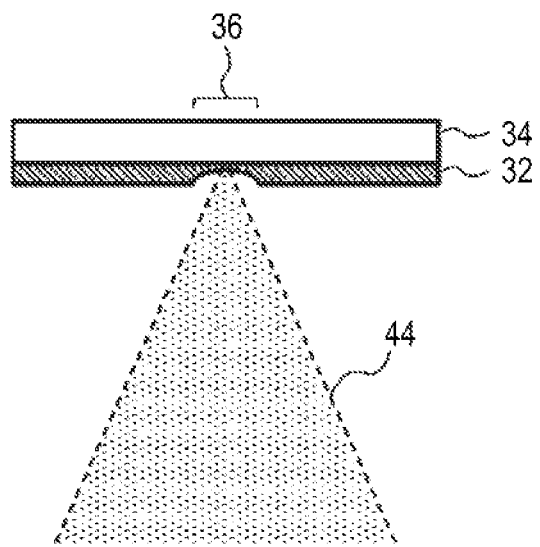
Figure 4C:
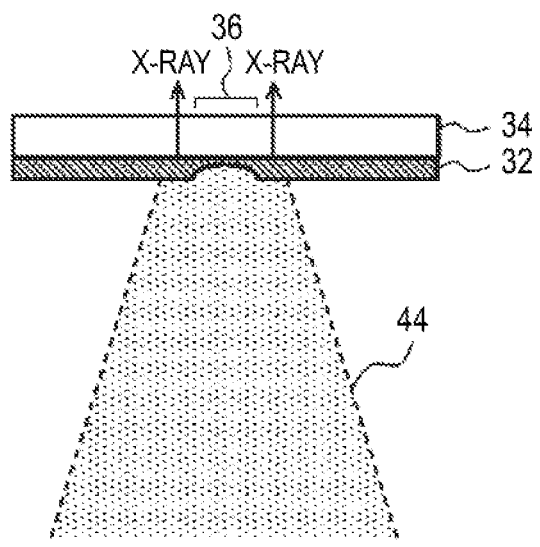

FIGS. 4A-4C are schematic diagrams illustrating that the focal point position of an electron beam 44 differs when different focus voltages are applied to the convergence electrode 26 by using the X-ray generation device 100 according to the first embodiment of the present invention in a state where the electron beam deflection unit 70 does not cause a magnetic field to work on the electron beam. FIG. 4A is a case where the focus voltage is A, which is a state (over focus state) where the focal point of the electron beam 44 is located on the electron source 22 side of the target 32. FIG. 4B is a case where the focus voltage is B (just focus voltage), which is a state (just focus state) where the focal point of the electron beam 44 is located on the target 32. FIG. 4C is a case where the focus voltage is C, which is a state (under focus state) where the focal point of the electron beam 44 is located at a position more distant from the electron source 22 than the target 32.

The ratio of the thin film portion 36 in the spot of the electron beam is larger when the focus voltage is B (state of just focus) than when the focus voltage is A or C. The thin film portion 36 is a region where the recess 38 or the through hole 40 is provided in the target 32, and the number of target atoms in the thin film portion 36 is smaller than the number of target atoms in a region around the thin film portion 36. Therefore, as the focus voltage approaches B (just focus voltage), the X-ray dose emitted from the target 32 decreases.

Figure 5A:
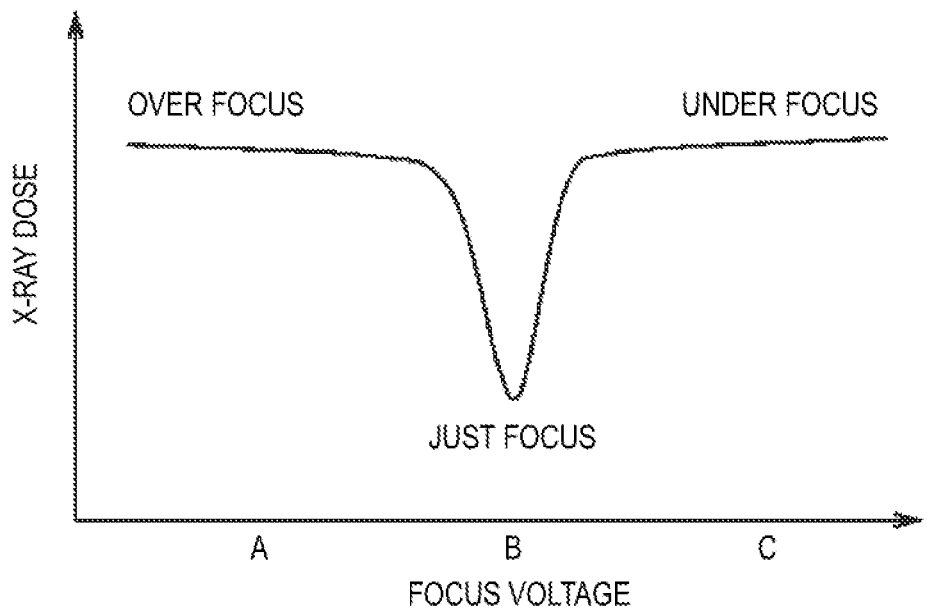
FIG. 5A and FIG. 5B are graphs illustrating relationships between an applied voltage to a convergence electrode and an X-ray dose.

FIG. 5A is a graph illustrating an example of a relationship between the X-ray dose emitted from the target 32 and the focus voltage applied to the convergence electrode 26 in a state where the electron beam deflection unit 70 does not cause a magnetic field to work on the electron beam (that is, a state where an electron beam trajectory (the center axis of the electron beam) is fixed so that the electron beam enters the thin film portion 36 of the target 32) in a use of the X-ray generation device 100 of the first embodiment of the present invention. As described above, as the focus voltage approaches B (just focus voltage), the X-ray dose emitted from the target 32 decreases. This is because the ratio of the thin film portion 36 in the spot of the electron beam increases as the spot of the electron beam decreases. When the thickness of the target 32 in the thin film portion 36 decreases continuous or stepwise toward the centroid (the center axis) of the thin film portion 36, the change rate of the X-ray dose around the just focus voltage more increases, which enables easier determination of the just focus voltage.

Figure 5B:
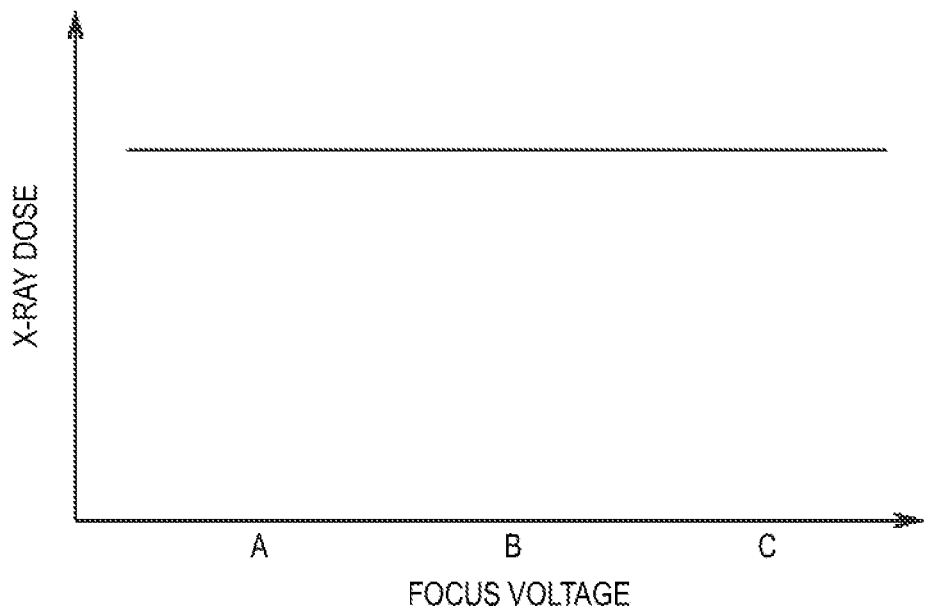

On the other hand, FIG. 5B is a graph illustrating, as a comparative example, a relationship between the X-ray dose emitted from the target 32 and the focus voltage applied to the convergence electrode 26 in a state where the electron beam enters a target 32 having a constant thickness (that is, a target without the thin film portion 36 being formed therein). In such a case, the X-ray dose emitted from the target 32 is constant regardless of the focus voltage.

Therefore, a focus voltage that minimizes the X-ray dose emitted when the electron beam enters the thin film portion 36 of the target 32 is the just focus voltage that minimizes the spot diameter of the electron beam and, at the same time, minimizes the X-ray focal spot diameter.

That is, the adjustment method of the X-ray focal spot diameter in the present invention is as follows. FIG. 6 is a flowchart illustrating the adjustment method of the X-ray focal spot diameter in the X-ray generation device according to the present embodiment. First, an electron beam is caused to enter the thin film portion 36 of the target 32 (step S101). Next, a plurality of focus voltages are applied to the convergence electrode 26, and each X-ray dose emitted from the X-ray generation device 100 is measured by an X-ray detector (a dosimeter or the like) provided outside the X-ray generation device 100. Then, information on the plurality of focus voltages and information on a plurality of corresponding X-ray doses are acquired as multiple pieces of associated information (step S102). A focus voltage that minimizes the X-ray dose is determined as the just focus voltage based on the multiple pieces of associated information (step S103). When the just focus voltage is determined, a relationship between the focus voltage and the X-ray dose may be acquired to calculate the just focus voltage based on the multiple pieces of associated information.

Since the thin film portion 36 of the first embodiment is located on the extended line of the center axis (optical axis) of the convergence electrode 26, switching of the incident position of the electron beam to the thin film portion 36 may be performed by removing the permanent magnet from the X-ray generation device 100 or may be performed by stopping the current applied to the electromagnet, for example.

Typically, a voltage table in which various X-ray emission conditions and just focus voltages for the conditions are recorded in association with each other is stored in an X-ray generation device. Conventionally, to create such a voltage table, it is necessary to acquire a plurality of X-ray transmission images with different focus voltages in various X-ray emission conditions, perform image processing on respective X-ray transmission images to finely compare the resolution, and determine a just focus voltage providing the highest resolution.

In contrast, in the X-ray generation device 100 according to the first embodiment, it is only required to find a focus voltage providing the least X-ray dose emitted when the electron beam enters the thin film portion 36 of the target 32 for each of the X-ray emission conditions. Therefore, in the X-ray generation device 100 according to the first embodiment, accurate image processing is not required in creating a voltage table, and creation of the voltage table can be simplified.

Further, since creation of a voltage table is easier, it is possible to regularly update the voltage table. Accordingly, even when the just focus voltage changes due to unexpected temporal change of the device, high resolution can be maintained over a long period.

On the other hand, when X-ray image capturing or the like is performed by using the X-ray generation device according to the first embodiment (in an X-ray generation mode), the electron beam emitted from the electron source 22 is deflected by the electron beam deflection unit 70, and the incident position of the electron beam is switched to the electron beam irradiation portion 42 of the target 32 (that is, the electron beam trajectory (the center axis of the electron beam) is fixed so that the electron beam enters the thin film portion 36 of the target 32). Further, the control unit 60 references the voltage table stored in the storage device 80 and applies the just focus voltage in accordance with a predetermined X-ray emission condition to the convergence electrode 26.

Note that, although the case where the thin film portion 36 is irradiated with the electron beam not deflected by the electron beam deflection unit 70 and the electron beam irradiation portion 42 is irradiated with the electron beam deflected by the electron beam deflection unit 70 has been illustrated as an example in the present embodiment, the regions irradiated with the electron beam may be opposite.

As described above, according to the present embodiment, the X-ray focal spot diameter can be easily reduced.

Second Embodiment

An X-ray generation device according to a second embodiment of the present invention will be described with reference to FIG. 7. The same components as those of the X-ray generation device in the first embodiment will be labeled with the same reference, and the description thereof will be omitted or simplified. FIG. 7 is a plan view illustrating a configuration example of an X-ray generation device according to the present embodiment.

In the first embodiment, the incident position of the electron beam to the target 32 is switched in accordance with whether or not a magnetic field works on the electron beam converged by the convergence electrode 26. In the second embodiment, an embodiment will be described in which the incident position of an electron beam to the target 32 is switched by changing the orientation of a magnetic field caused to work on the electron beam.

The electron beam deflection unit 70 according to the second embodiment is configured so that the orientation of a magnetic field applied so as to deflect the electron beam can be rotated about the center axis (optical axis) of the convergence electrode 26 as an axis. For example, a pair of electron beam deflection units 70 interposing the X-ray tube 20 and facing each other may have a rotary mechanism having a motor or the like to rotate the electron beam deflection units 70 about the center axis of the convergence electrode 26 as an axis. With such a configuration, the orientation of the magnetic field occurring between the pair of the electron beam deflection units 70 can be rotated about the center axis of the convergence electrode 26 as an axis. FIG. 7 illustrates a case as an example where a pair of electron beam deflection units 70 interposing the X-ray tube 20 and facing each other is configured to be rotated by a step of 30 degrees about the center axis of the convergence electrode 26 as an axis.

When the electron beam deflection units 70 are located as illustrated in FIG. 7, the electron beam emitted from the electron source 22 is forced to be deflected by Lorentz force and enters the electron beam irradiation portion 42 of the target 32. The electron beam irradiation portion 42 changes in accordance with the position of the electron beam deflection units 70. When the electron beam deflection units 70 are configured to be rotated by a step of 30 degrees, the position of the electron beam irradiation portion 42 is also located at a position rotated by a step of 30 degrees about the center axis of the convergence electrode 26 as an axis, as illustrated by black circles and a white circuit in FIG. 7.

In the second embodiment, the thin film portion 36 whose thickness is locally small is provided in any position that the electron beam may enter in response to rotation of the electron beam deflection units 70. For example, a position that the electron beam enters when the electron beam deflection units 70 has moved to the position of the electron beam deflection units 70' is defined as the thin film portion 36 in the example of FIG. 7.

With such a configuration of the target 32, with only a change of the orientation of the magnetic field applied to the electron beam by the electron beam deflection unit 70, the position that the electron beam enters can be easily switched between the thin film portion 36 and the electron beam irradiation portion 42. Further, when the electron beam irradiation portion 42 of the target 32 is deteriorated (that is, the film thickness is reduced) due to a long period of use, the deteriorated electron beam irradiation portion 42 may be used as a new thin film portion 36. In such a case, a not-deteriorated target region that the electron beam deflected by the electron beam deflection units 70 may enter is set as a new electron beam irradiation portion 42. Further, with only a change of the orientation of the magnetic field applied by the electron beam deflection unit 70, the incident position of the electron beam can be switched to the new electron beam irradiation portion 42.

Note that, although the example in which the electron beam deflection units 70 are formed of permanent magnets and a rotary mechanism is used to rotate the electron beam deflection units 70 has been illustrated in the present embodiment, the electron beam deflection units 70 may be formed of electromagnets. Further, multiple pairs of the electron beam deflection units 70 formed of electromagnets may be arranged, and a magnetic field in a desired direction may be formed by supplying current to any of the electromagnets instead of rotating the electron beam deflection units 70.

As described above, also in the second embodiment, it is possible to easily reduce the X-ray focal spot diameter in the same principle in the first embodiment without performing accurate image processing.

Third Embodiment

In the first embodiment, the incident position of the electron beam to the target 32 is switched in accordance with whether or not a magnetic field works on the electron beam converged by the convergence electrode 26. Further, in the second embodiment, the incident position of the electron beam to the target 32 is switched by changing the orientation of a magnetic field caused to work on the electron beam. In a third embodiment, an embodiment in which the incident position of the electron beam to the target 32 is switched by changing the magnitude of a magnetic field caused to work on the electron beam will be described.

The electron beam deflection unit 70 of the third embodiment is configured so as to be able to change the magnitude of the magnetic field applied to deflect the electron beam. For example, it is possible to change the magnitude of the magnetic field caused to work on the electron beam by changing the current applied to the electromagnet or changing the number of permanent magnets to be installed. That is, when the electron beam deflection unit 70 is formed of permanent magnets, it is possible to increase the magnitude of the magnetic field caused to work on the electron beam by increasing the number of permanent magnets. When the electron beam deflection unit 70 is formed of an electromagnet, it is possible to increase the magnitude of the magnetic field caused to work on the electron beam by increasing the current applied to the electromagnet. With an increased magnitude of the magnetic field caused to work on the electron beam, Lorentz force applied to electrons becomes larger, and the deflection amount of the electron beam becomes much larger.

Figure 8:
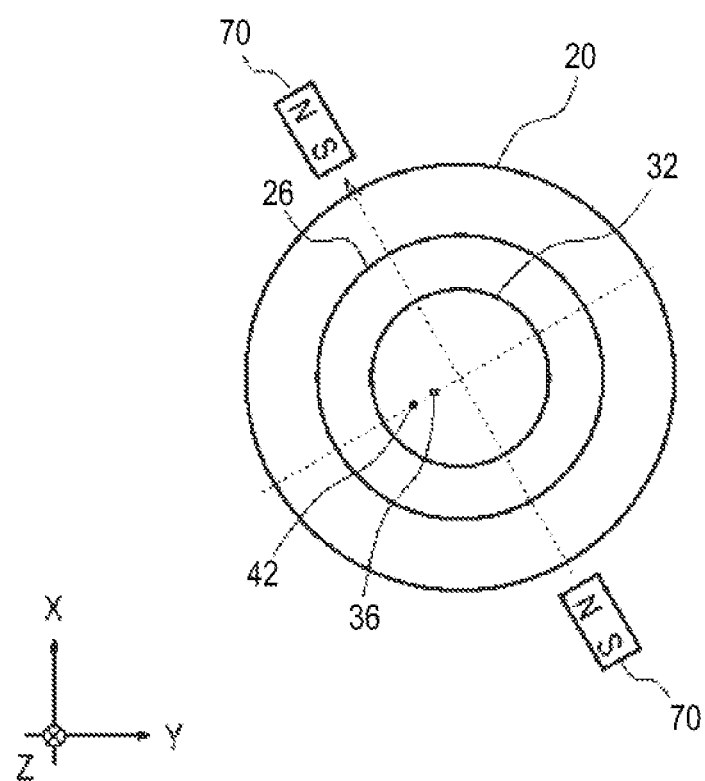
FIG. 8 is a plan view illustrating a configuration example of the X-ray generation device according to a third embodiment of the present invention.

FIG. 8 schematically illustrates an irradiation position of the electron beam to the target 32 when the magnetic field applied by the electron beam deflection unit 70 is changed between a first magnitude and a second magnitude that is different from the first magnitude. FIG. 8 illustrates an example in which the magnetic field caused to work on the electron beam is set to the first magnitude to cause the electron beam to enter the thin film portion 36, and the magnetic field caused to work on the electron beam is set to the second magnitude, which is larger than the first magnitude, to cause the electron beam to enter the electron beam irradiation portion 42. In such a case, the thin film portion 36 is located on a side closer to the center axis of the convergence electrode 26 than the electron beam irradiation portion 42.

The magnetic field caused to work on the electron beam may be set to the first magnitude to cause the electron beam to enter the thin film portion 36, and the magnetic field caused to work on the electron beam may be set to the second magnitude that is smaller than the first magnitude to cause the electron beam to enter the electron beam irradiation portion 42. In such a case, the thin film portion 36 is located on aside farther from the center axis of the convergence electrode 26 than the electron beam irradiation portion 42.

With such a configuration of the target 32, with only a change of the magnitude of the magnetic field applied to the electron beam by the electron beam deflection unit 70, the position that the electron beam enters can be easily switched between the thin film portion 36 and the electron beam irradiation portion 42.

As described above, also in the third embodiment, it is possible to easily reduce the X-ray focal spot diameter in the same principle in the first embodiment without performing accurate image processing.

Fourth Embodiment

An X-ray image capture system according to a fourth embodiment of the present invention will be described with reference to FIG. 9 and FIG. 10. The same components as those of the X-ray generation devices in the first and second embodiments will be labeled with the same reference, and the description thereof will be omitted or simplified.

First, the general configuration of the X-ray image capture system according to the present embodiment will be described with reference to FIG. 9. FIG. 9 is a block diagram illustrating the general configuration of the X-ray image capture system according to the present embodiment.

Figure 9:
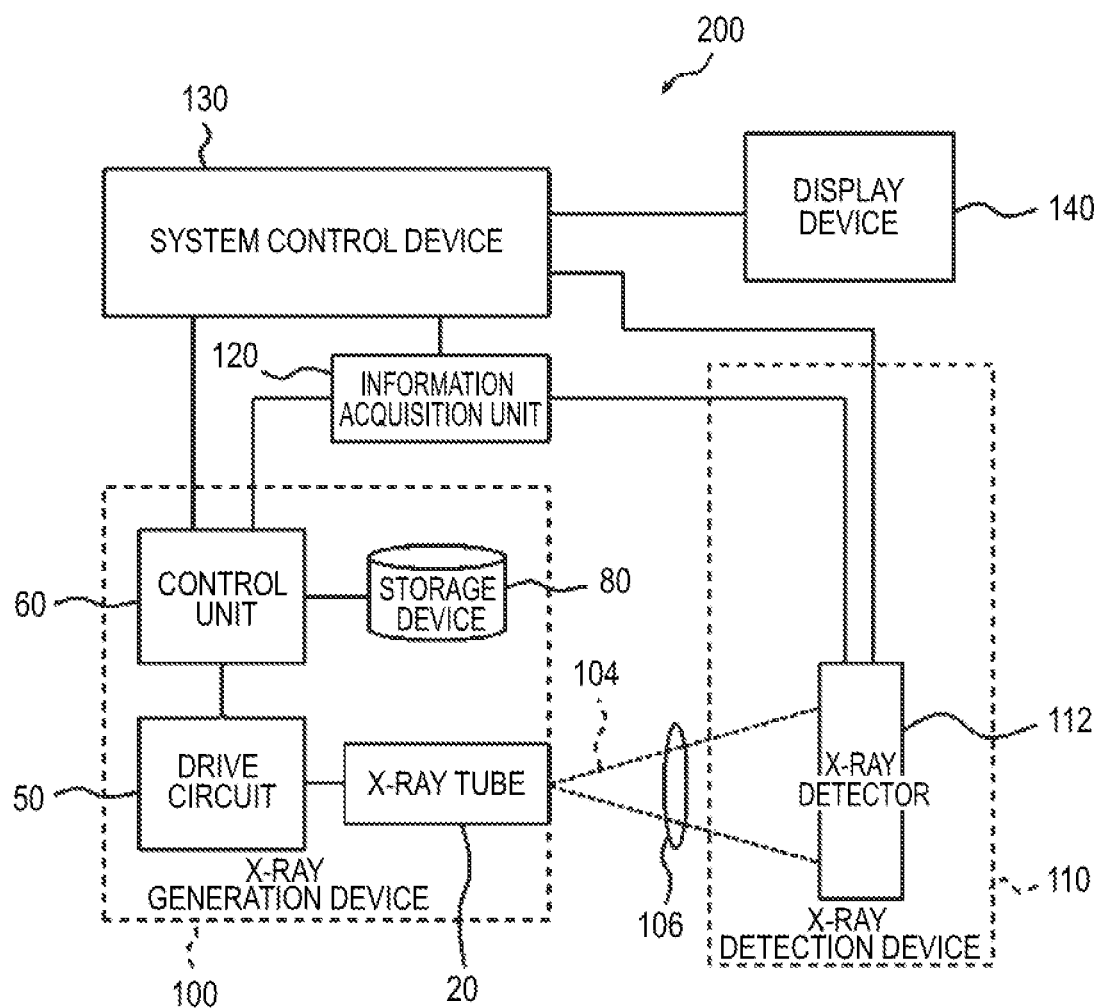
FIG. 9 is a block diagram illustrating a general configuration of an X-ray image capture system according to a fourth embodiment of the present invention.

As illustrated in FIG. 9, an X-ray image capture system 200 according to the present embodiment includes the X-ray generation device 100, an X-ray detection device 110, an information acquisition unit 120, a system control device 130, and a display device 140. The X-ray generation device 100 is the X-ray generation device of the first or second embodiment and includes the X-ray tube 20, the drive circuit 50, the control unit 60, and the storage device 80. The control unit 60 further has a function as a receiving unit that receives information including information on an X-ray dose acquired by the X-ray detection device 110 in addition to the functions described in the first and second embodiments. The X-ray detection device 110 includes an X-ray detector 112.

The system control device 130 is connected to the control unit 60 of the X-ray generation device 100, the X-ray detector 112 of the X-ray detection device 110, the information acquisition unit 120, and the display device 140.

Next, the characteristic structure of the X-ray image capture system of the fourth embodiment will be described. The X-ray image capture system of the fourth embodiment includes the information acquisition unit 120. The information acquisition unit 120 has a function of acquiring the focus voltage applied to the convergence electrode 26 and the X-ray dose detected by the X-ray detector 112 when the focus voltage is applied as associated information. The information acquisition unit 120 may be of any configuration as long as it has such a function. For example, as illustrated in FIG. 9, the information acquisition unit 120 may be formed of independent components connected to the X-ray generation device 100, the X-ray detection device 110, and the system control device 130, respectively, or may be a part of any of the X-ray generation device 100, the X-ray detection device 110, and the system control device 130.

Next, the outline of the operation of the X-ray image capture system 200 according to the present embodiment will be described with reference to FIG. 9.

The system control device 130 is responsible for overall control of the system including the X-ray generation device 100, the X-ray detection device 110, and the information acquisition unit 120. The control unit 60 of the X-ray generation device 100 controls the drive circuit 50 in response to an instruction from the system control device 130 and outputs various control signals to the X-ray tube 20. For example, the system control device 130 provides information on X-ray emission conditions (for example, a tube voltage and a tube current) to the control unit 60. The control unit 60 that has received the information on the X-ray emission conditions references the voltage table stored in the storage device 80 and acquires a just focus voltage in the X-ray emission condition provided from the system control device 130. The control unit 60 controls the drive circuit 50 and outputs various drive signals such as the tube voltage in accordance with the X-ray emission condition, the just focus voltage acquired from the voltage table, or the like to the X-ray tube 20. Accordingly, the emission state of an X-ray emitted from the X-ray generation device 100 can be controlled.

An X-ray 104 emitted from the X-ray generation device 100 transmits through an object 106 and is detected by the X-ray detector 112. The X-ray detector 112 may be of any form as long as it can measure the dose (exposure dose, absorbed dose, dose equivalent, radioactivity, or the like) of the X-ray emitted from the X-ray generation device 100 as two-dimensional information. The X-ray detector 112 has a plurality of detection elements (for example, a dosimeter or a counter tube) (not illustrated) and acquires a transmission X-ray image. Alternatively, the X-ray detector 112 having an image intensifier, a camera, or the like may be used to acquire information on the X-ray dose. The X-ray detector 112 converts an acquired transmission X-ray image into an image signal and outputs the image signal. A slit, a collimator, or the like (not illustrated) may be arranged between the X-ray tube 20 and the object 106 in order to suppress unnecessary X-ray irradiation.

The X-ray detector 112 performs predetermined signal processing on an image signal under the control of the system control device 130 and outputs the processed image signal to the system control device 130. The system control device 130 outputs a display signal to the display device 140 in order to display an image on the display device 140 based on the processed image signal. The display device 140 displays a captured image of the object 106 based on a display signal on a screen.

Next, the adjustment method for the X-ray focal spot diameter in the X-ray image capture system 200 according to the present embodiment will be described with reference to FIG. 9 and FIG. 10. FIG. 10 is a flowchart illustrating the adjustment method for the X-ray focal spot diameter in the X-ray image capture system according to the present embodiment.

Figure 10:
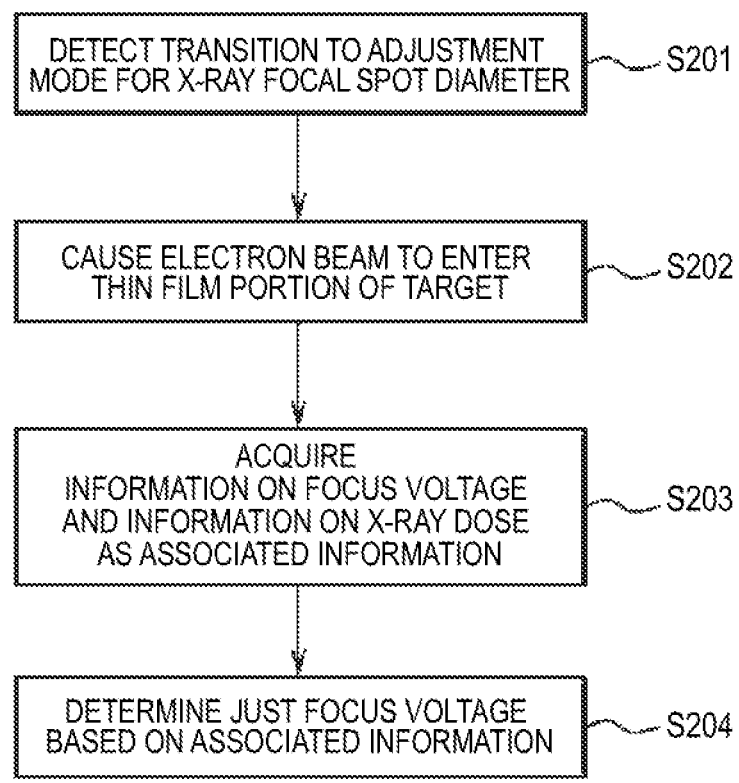
FIG. 10 is a flowchart illustrating an adjustment method of an X-ray focal spot diameter in the X-ray image capture system according to the fourth embodiment of the present invention.

The adjustment method for the X-ray focal spot diameter in the X-ray image capture system 200 according to the present embodiment can be implemented when performed by the control unit 60 of the X-ray generation device 100 or the system control device 130 via the control unit 60 in accordance with the flowchart illustrated in FIG. 10, for example. Each step illustrated in the flowchart of FIG. 10 can be implemented in a hardware-like manner by mounting circuit components, which are hardware components such as LSI or the like in which a program is embedded, on the control unit 60 or the system control device 130. Alternatively, each step can be implemented in a software-like manner by causing a computer forming the control unit 60 or the system control device 130 to execute a program used for performing each step illustrated in the flowchart of FIG. 10.

Alternatively, the program described above may be stored in a storage medium, and the program stored in the storage medium may be read as a code and executed by a computer. That is, a computer readable storage medium is also included in the scope of the present embodiment. Further, not only the storage medium in which the program described above is stored but also the program itself is included in the scope of the present embodiment. As the storage medium, for example, a floppy (registered trademark) disk, a hard disk, an optical disk, a magneto-optical disk, a CD-ROM, a magnetic tape, a nonvolatile memory card, or a ROM can be used. Further, the scope of the present embodiment includes an example that operates on OS to perform a process in cooperation with another software or a function of an add-in board without being limited to an example that performs a process by a program alone stored in the storage medium.

The system control device 130 transitions to an adjustment mode to adjust the X-ray focal spot diameter in response to an instruction from a user or at a timing when a predetermined condition is met. The system control device 130 notifies the control unit 60 in the X-ray generation device 100 and the X-ray detection device 110 of the information indicating that transition to the adjustment mode to adjust the X-ray focal spot diameter has been made.

The predetermined condition may be, for example, that an accumulated irradiation time at a point of the target 32 irradiated with the electron beam has elapsed and exceeds a predetermined period, that the X-ray dose decreases below a predetermined value, or the like. In such a way, automatic transition to the adjustment mode to adjust the X-ray focal spot diameter is performed regularly and thereby high resolution can be maintained over a longer period.

In response to receiving information from the system control device 130, the control unit 60 detects that transition to the adjustment mode to adjust the X-ray focal spot diameter has been made (step S201).

The control unit 60 that has detected the transition to the adjustment mode to adjust the X-ray focal spot diameter controls the electron beam deflection unit 70 so that the electron beam emitted from the electron source 22 enters a region including the thin film portion 36 of the target 32 (step S202).

Next, the control unit 60 sets the voltage value of the focus voltage applied to the convergence electrode 26 to a plurality of values and controls the drive circuit 50 so as to emit an X-ray from the X-ray tube 20 at each of the voltage values. For example, the control unit 60 sets the voltage values of the focus voltage applied to the convergence electrode 26 to a plurality of values in the X-ray emission conditions (the tube current and the tube voltage) specified by the system control device 130. The information on the focus voltages set by the control unit 60 for the drive circuit 50 is transmitted to the information acquisition unit 120.

The X-ray detector 112 of the X-ray detection device 110 detects the X-ray emitted from the X-ray generation device 100 caused by the electron beam entering the thin film portion 36 of the target 32. The X-ray detection device 110 transmits information on the X-ray dose detected by the X-ray detector 112 to the information acquisition unit 120.

The information acquisition unit 120 acquires information on the focus voltage received from the control unit 60 and information on the X-ray dose received from the X-ray detection device 110 as information associated with each other (step S203). That is, the information acquisition unit 120 associates the information on the voltage value of the focus voltage with the information on the X-ray dose obtained at that time. The information acquisition unit 120 or the system control device 130 determines a voltage value providing the smallest X-ray dose from the information in which the voltage values and the X-ray doses are associated with each other. The relationship between the focus voltage and the X-ray dose may be acquired from multiple pieces of information, and a voltage value that may provide the smallest X-ray dose may be calculated and determined based on the relationship (step S204). The voltage value determined in such a way is the voltage value providing the smallest spot diameter of the electron beam and, at the same time, a voltage value providing the smallest X-ray focal spot diameter (just focus voltage value).

The control unit 60 sets the focus voltage applied to the convergence electrode 26 to the just focus voltage value determined in step S104. Accordingly, the spot diameter of the electron beam entering the target 32 can be optimized.

The just focus voltage value determined in such a way can be associated with the X-ray emission conditions and stored as the voltage table in the storage device 80 of the X-ray generation device 100. Alternatively, the voltage table that has already been stored may be updated with the newly acquired just focus voltage value.

Next, an image capture mode to capture a transmission X-ray image of the object 106 will be described. The system control device 130 causes the X-ray image capture system 200 to enter the image capture mode in response to an instruction from the user or at a timing when a predetermined condition is met (such as at the end of the adjustment mode for the X-ray focal spot diameter). The system control device 130 notifies the control unit 60 in the X-ray generation device 100 of the information indicating that transition to the image capture mode has been made. The control unit 60 that has detected the transition to the image capture mode controls the electron beam deflection unit 70 so that the electron beam emitted from the electron source 22 enters the electron beam irradiation portion 42 of the target 32.

The control unit 60 references the voltage table stored in the storage device 80, selects the just focus voltage in accordance with a predetermined X-ray emission condition, and controls the X-ray tube 20 via the drive circuit 50. Accordingly, the spot diameter of the electron beam entering the target 32 can be optimized, and a fine focal spot diameter of the X-ray emitted from the X-ray tube 20 can be achieved.

As described above, according to the present embodiment, it is possible to easily reduce an X-ray focal spot diameter without requiring efforts such as image processing. Accordingly, capturing of a transmission X-ray image with high resolution can be easily realized.

Modified Embodiments

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is one of the embodiments of the present invention.

All the embodiments described above merely illustrate embodied examples in implementing the present invention, and the technical scope of the present invention should not be construed in a limiting sense by these embodiments. That is, the present invention can be implemented in various forms without departing from the technical scope thereof or the primary feature thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An X-ray generation device comprising: a cathode including an electron source that generates an electron beam; an anode including a transmission type target configured to transmit, in an incident direction of the electron beam, an X-ray generated by collision of the electron beam; and a convergence electrode that converges the electron beam toward the transmission type target,
    wherein the transmission type target has a first region having a locally small thickness and a second region having a larger thickness than the first region,
    wherein the X-ray generation device further comprises an electron beam deflection unit configured to switch an incident position of the electron beam to the transmission type target between the first region and the second region, and
    wherein the electron beam deflection unit has an adjustment mode to adjust an X-ray focal spot diameter and an X-ray generation mode to generate an X-ray, the electron beam is caused to enter the first region in the adjustment mode, and the electron beam is caused to enter the second region in the X-ray generation mode.

2. The X-ray generation device according to claim 1, wherein the first region is positioned on an extended line of a center axis of the convergence electrode.

3. The X-ray generation device according to claim 1, wherein the electron beam deflection unit is configured to switch an incident position of the electron beam to the transmission type target between the first region and the second region in accordance with whether or not a magnetic field is applied to the electron beam.

4. The X-ray generation device according to claim 1, wherein the first region and the second region are positioned on a concentric circle about a center axis of the convergence electrode.

5. The X-ray generation device according to claim 1, wherein the electron beam deflection unit is configured to cause the electron beam to enter the first region by causing a magnetic field in a first direction to work on the electron beam and to cause the electron beam to enter the second region by causing a magnetic field in a second direction, which is different from the first direction, to work on the electron beam.

6. The X-ray generation device according to claim 1, wherein the electron beam deflection unit is configured to cause the electron beam to enter the first region by causing a magnetic field of a first magnitude to work on the electron beam and to cause the electron beam to enter the second region by causing a magnetic field of a second magnitude, which is different from the first magnitude, to work on the electron beam.

7. The X-ray generation device according to claim 1 further comprising an information acquisition unit that acquires information associating information related to a voltage applied to the convergence electrode with information related to an X-ray dose emitted from the transmission type target.

8. The X-ray generation device according to claim 1, wherein a voltage table in which a just focus voltage is recorded on an X-ray emission condition basis is configured to be updated.

9. The X-ray generation device according to claim 1, wherein the first region is a recess or a through hole.

10. An X-ray image capture system comprising:
    the X-ray generation device according to claim 1;
    an X-ray detection device that detects an X-ray dose emitted from the X-ray generation device; and
    an information acquisition unit that acquires information associating information related to a voltage applied to the convergence electrode with information related to an X-ray dose supplied from the X-ray detection device.

11. The X-ray image capture system according to claim 10,
    wherein the X-ray image capture system has an adjustment mode to adjust an X-ray focal spot diameter, and
    wherein in the adjustment mode, the electron beam deflection unit causes the electron beam to enter the first region, and the information acquisition unit acquires a relationship between the voltage and the X-ray dose from multiple pieces of the associated information and determines a just focus voltage based on the relationship.

12. The X-ray image capture system according to claim 11,
    wherein the X-ray generation device further includes
        a voltage table in which a just focus voltage is recorded on an X-ray emission condition basis, and
        a control unit that determines a voltage to be applied to the convergence electrode based on the voltage table.

13. The X-ray image capture system according to claim 12, wherein the X-ray generation device updates the voltage table based on information acquired by the information acquisition unit.

14. The X-ray image capture system according to claim 10,
wherein the X-ray image capture system has an image capture mode to capture a transmission X-ray image of an object, and
wherein in the image capture mode, the electron beam deflection unit causes the electron beam to enter the second region to generate an X-ray, and the X-ray detection device detects an X-ray emitted from the X-ray generation device and transmitted through an object.

15. A method of adjusting an X-ray focal spot diameter in an X-ray generation device including a cathode including an electron source that generates an electron beam, an anode including a transmission type target configured to transmit, in an incident direction of the electron beam, an X-ray generated by collision of the electron beam, and a convergence electrode that converges the electron beam toward the transmission type target, the method comprising:
changing an applied voltage to the convergence electrode in a state where the electron beam enters a first region having a locally small thickness formed in the transmission type target; and
acquiring a relationship between the applied voltage to the convergence electrode and an X-ray dose emitted from the transmission type target and determining a just focus voltage based on the relationship.

16. The method of adjusting an X-ray focal spot diameter according to claim 15, wherein the just focus voltage is updated every time an accumulated irradiation time of the electron beam to a second region of the transmission type target having a larger thickness than the first region exceeds a predetermined period.

17. The method of adjusting an X-ray focal spot diameter according to claim 15, wherein the just focus voltage is updated when an X-ray dose generated from a second region of the transmission type target having a larger thickness than the first region is not more than a predetermined amount.

18. A non-transitory computer readable storage medium storing a program that causes a computer to perform the method of adjusting an X-ray focal spot diameter according to claim 15.

19. The X-ray generation device according to claim 1, wherein a thickness of the first region decreases continuously or stepwise toward the centroid of the first region.

20. The X-ray generation device according claim 1, wherein an X-ray dose emitted outside the X-ray generation device due to incidence of the electron beam is larger in the second region than in the first region.

* * * * *